US012613255B2

(12) United States Patent  
Mikami et al.

(10) Patent No.: US 12,613,255 B2  
(45) Date of Patent: *Apr. 28, 2026

(54) ROTATION STATE ESTIMATION APPARATUS, METHOD THEREOF, AND PROGRAM

(71) Applicant: NTT, Inc., Tokyo (JP)

(72) Inventors: Dan Mikami, Tokyo (JP); Naoki Saijo, Tokyo (JP); Masumi Yamaguchi, Tokyo (JP); Takehiro Fukuda, Tokyo (JP); Susumu Yamamoto, Tokyo (JP); Makio Kashino, Tokyo (JP)

(73) Assignee: NTT, Inc., Tokyo (JP)

( * ) Notice: Subject to any disclaimer, the term of this patent is extended or adjusted under 35 U.S.C. 154(b) by 323 days.

This patent is subject to a terminal disclaimer.

(21) Appl. No.: 18/273,872

(22) PCT Filed: Jan. 28, 2021

(86) PCT No.: PCT/JP2021/003024  
§ 371 (c)(1),  
(2) Date: Jul. 24, 2023

(87) PCT Pub. No.: WO2022/162831  
PCT Pub. Date: Aug. 4, 2022

(65) Prior Publication Data  
US 2024/0069055 A1 Feb. 29, 2024

(51) Int. Cl.  
*G01P 3/38* (2006.01)  
*G06T 7/246* (2017.01)

(52) U.S. Cl.  
CPC ............... *G01P 3/38* (2013.01); *G06T 7/248* (2017.01); *G06T 2207/10016* (2013.01); *G06T 2207/30224* (2013.01)

(58) Field of Classification Search  
None  
See application file for complete search history.

(56) References Cited

U.S. PATENT DOCUMENTS

| | | | | |
|---|---|---|---|---|
| 9,855,481 | B2 * | 1/2018 | Tuxen | G06F 18/22 |
| 9,911,046 | B1 * | 3/2018 | Yakimenko | G06V 10/44 |

(Continued)

FOREIGN PATENT DOCUMENTS

JP 2020153677 A 9/2020

OTHER PUBLICATIONS

Ijiri et al. "Automatic spin measurements for pitched Baseballs via consumer-grade high-speed cameras", Springer-Verlag London 2017 (Year: 2017).*

(Continued)

*Primary Examiner* — Randolph I Chu

(57) ABSTRACT

A target estimation image which is an image of a target at a time point t+w·u obtained by spinning the object in an object image which is an image of the object at a time point t obtained from an input video in time-series by w unit time on the basis of a hypothesis of spin state and an object image at the time point t+w·u obtained from the input video are used, to estimate a spin state of the object by selecting a hypothesis of spin state and w in which likelihood of the target estimation image becomes high from among a plurality of hypotheses of spin states and a plurality of w, wherein an absolute value of W is an integer of 1 or more and u is a unit time.

6 Claims, 15 Drawing Sheets

(56) References Cited

U.S. PATENT DOCUMENTS

| | | | | |
|---|---|---|---|---|
| 10,319,108 | B2 * | 6/2019 | Segert | G06T 7/77 |
| 2013/0135466 | A1 * | 5/2013 | Kim | G06T 7/246 |
| | | | | 348/142 |
| 2014/0185881 | A1 * | 7/2014 | Nakamura | G06T 7/223 |
| | | | | 382/107 |
| 2016/0350922 | A1 * | 12/2016 | Tofolo | G06T 7/97 |
| 2018/0005385 | A1 * | 1/2018 | Suk | G06T 7/246 |
| 2018/0174308 | A1 * | 6/2018 | Ijiri | G06V 10/772 |
| 2018/0353828 | A1 * | 12/2018 | Otten | A63B 24/0003 |
| 2022/0152453 | A1 | 5/2022 | Mikami et al. | |
| 2022/0375203 | A1 * | 11/2022 | Mikami | G06T 7/20 |
| 2024/0104750 | A1 * | 3/2024 | Mikami | G06V 10/62 |
| 2024/0112346 | A1 * | 4/2024 | Mikami | G06T 7/248 |

OTHER PUBLICATIONS

Sz'ep, "Ballrotationdetectionbased on Arbitraryfeatures", In Proceedings of the International Conferenceon Computer Vision Theory and Applications (VISAPP-2011), pp. 700-703 (Year: 2011).*

Theobalt et al., "Pitching a Baseball |Tracking High-Speed Motion with Multi-Exposure Images", 2004 ACM 0730-0301/04/0800-0540 (Year: 2004).*

Jiri et al. (2017) "Automatic spin measurements for pitched Baseballs via consumer-grade high-speed cameras" Signal, Image and Video Processing, vol. 11, Issue 7, issued on Oct. 2017.

* cited by examiner

INPUT VIDEO

FIG. 6A
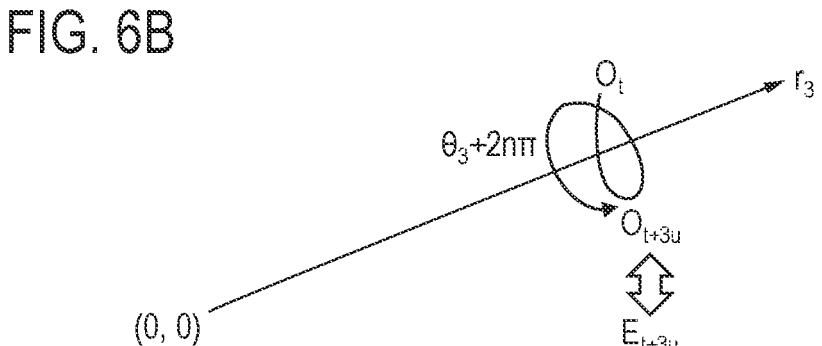
FIG. 6B
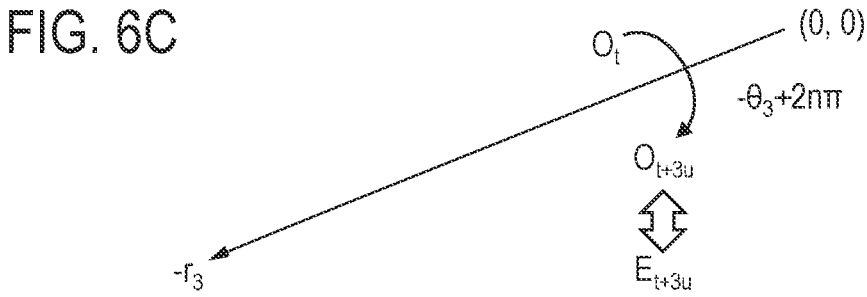
FIG. 6C

ROTATION STATE ESTIMATION APPARATUS, METHOD THEREOF, AND PROGRAM

CROSS-REFERENCE TO RELATED APPLICATIONS

This application is a U.S. National Stage Application filed under 35 U.S.C. § 371 claiming priority to International Patent Application No. PCT/JP2021/003024, filed on 28 Jan. 2021, the disclosure of which is hereby incorporated herein by reference in its entirety.

TECHNICAL FIELD

The present invention relates to a technique for estimating a spin state of an object such as a flying ball.

BACKGROUND ART

The technique for estimating the spin state of the object such as the flying ball is disclosed in NPL 1. In this technique, the spin period T is obtained by detecting the time $t+T$ at which the appearance of the ball in a certain frame t appears again from the input video, the number of spins of the ball is obtained from the spin period T and the spin shaft of the ball which fits most between adjacent frames is obtained. However, the technique of NPL 1 cannot estimate the spin state of the object when no input video for one period is obtained.

On the other hand, there is a technique described in PTL 1 which can estimate the spin state of the object even when an input video for one period is not obtained. In this technique, the object image at a time point t and the object image at a time point $t+t_c$ obtained from an input video are used where $t_c$ is an integer of 1 or more, to estimate the spin state of the object, by selecting a hypothesis of spin state in which likelihood of the image of the object obtained by spinning the object in an object image at a time point t by $t_c$ unit time on the basis of the hypothesis of spin state is high from among the plurality of hypotheses of spin states.

PRIOR ART LITERATURE

Patent Literature

[PTL 1] Japanese Patent Application Laid-open No. 2020-153677

Non Patent Literature

[NPL 1] Takashi Ijiri, Atsushi Nakamura, Akira Hirabayashi, Wataru Sakai, Takeshi Miyazaki, Ryutaro Himeno, "Automatic spin measurements for pitched Baseballs via consumer-grade high-speed cameras", Signal, Image and Video Processing, Vol. 11, Issue 7, 2017

SUMMARY OF INVENTION

Problems to be Solved by the Invention

However, according to the technique of PTL 1, $t_c$ is a fixed value, and depending on a hypothesis of spin state, an image of an object obtained by spinning an object in an object image at time point t by $t_c$ unit time may not be generated. That is, in order to generate the image of the object spun by $t_c$ unit time, the component of the image obtained by spinning the object by $t_c$ unit time must be included in the original object image at the time point t. However, when $t_c$ is the fixed value, the condition may not be satisfied depending on the hypothesis of spin state. For example, in a case when the unit time is a frame interval, $t_c=1$ is established, and the frame rate of the input video is low (for example, in the case of about 120 fps), when the spin amount per unit time represented by the hypothesis of spin state is large, the component of the image of the object obtained by spinning the object by $t_c$ unit time is not included, and the image of the object obtained by sinning the object by $t_c$ unit time may not be generated. In this way, when it is impossible to generate the image of the object obtained by spinning the object in the object image at the time point t by $t_c$ unit time, the method of PTL 1 cannot properly estimate the spin state of the object. On the other hand, although such a problem can be solved by increasing the frame rate of the input video, when the frame rate of the input video is high (for example, about 480 fps), the recordable time is shortened.

The present invention was made in view of the above circumstances, and an object of the present invention is to provide a technique capable of estimating a spin state of an object regardless of a frame rate of an input video.

Means to Solve the Problems

In order to solve the above problem, a target estimation image which is an image of an object at a time point $t+w\cdot u$ obtained by spinning the object in an object image which is the image of the object at a certain time point t obtained from an input video in time-series by w unit time on the basis of a hypothesis of spin state and an object image at a time point $t+w\cdot u$ obtained from the input video are used wherein an absolute value of w is an integer of 1 or more and u is a unit time, to estimate the spin state of object by selecting a hypothesis of spin state and w in which likelihood of the target estimation image becomes high from among a plurality of hypotheses of spin states and a plurality of w.

Effects of Invention

Since the spin state of the object is estimated by selecting not only the hypothesis of spin state but also w, the spin state of the object can be estimated regardless of the frame rate of the input video.

BRIEF DESCRIPTION OF DRAWINGS

FIGS. 6A to 6C are diagrams for explaining uncertainty of a spin state estimated in the embodiment.

DETAILED DESCRIPTION OF EMBODIMENTS

An embodiment of the present invention will be described below with reference to the drawings. Note that constituent units having the same function are denoted by the same number, and redundant description is omitted.

First Embodiment

Figure 1:
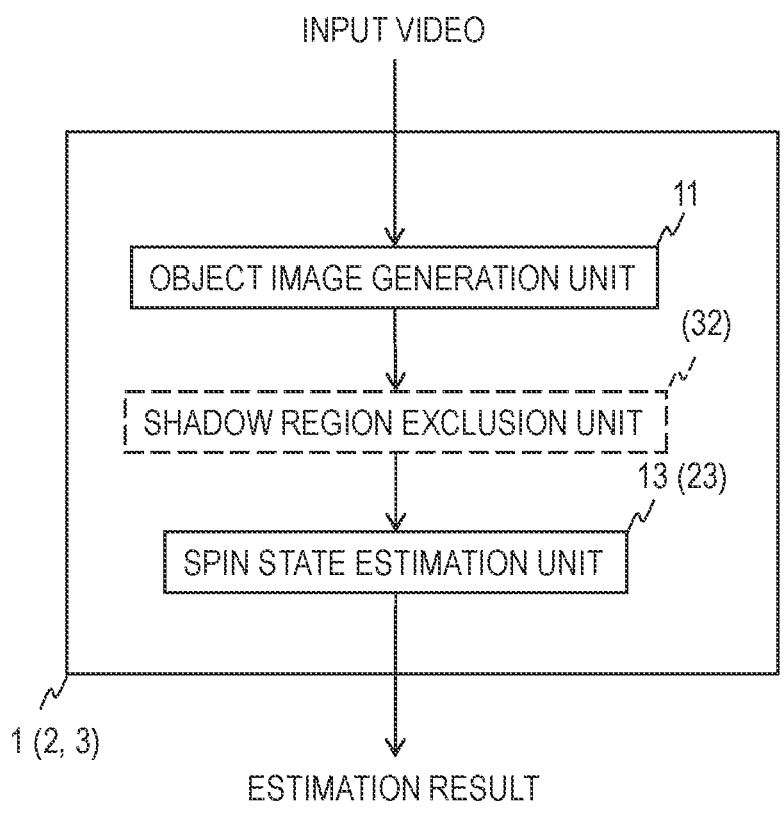
FIG. 1 is a block diagram for exemplifying a functional configuration of a spin state estimation device of an embodiment.

As exemplified in FIG. 1, a spin state estimation device 1 of the present embodiment includes, for example, an object image generation unit 11 and a spin state estimation unit 13. As exemplified in FIG. 2, a spin state estimation method of the present embodiment is realized, for example, by each constituent unit of the spin state estimation device 1 performing the processing in steps S11 and S13 described below. This will be described in detail below.

<Object Image Generation Unit 11 (Step S11)>

The object image generation unit 11 receives a video of an object (referred to an "input video" below). The object is an object which is a target of estimation of a spin state. An example of the object is a ball. Hereinafter, the case where the object is a ball of baseball will be described as an example. Of course, the object is not limited to a baseball ball, but may be a ball of a soft ball, a ball of a boring, a soccer ball or the like. The spin state of the object is information corresponding to at least one of a spin shaft and a spin amount of the object. The information corresponding to the spin shaft of the object is, for example, information representing the spin shaft of the object (the spin shaft of a rotation of the object), and one example of the information is a coordinate or an angle representing the spin shaft. More preferably, the information corresponding to the spin shaft of the object is information representing the spin shaft and the spin direction of the object. An example of such information is a two-dimensional coordinate (x, y), when a spin shaft is parallel to a straight-line L passing through the two-dimensional coordinate (x, y) and an origin (0, 0) and the two-dimensional coordinate (x, y) is viewed from the origin (0, 0), a predetermined spin direction R (a right spin direction or a left spin direction) around the straight-line L is the spin direction of the object. The information corresponding to the spin amount of the object is, for example, an angle and the number of spins representing the spin amount, the number of spins (for example, rpm: revolutions per minute, rps: revolutions per second, revolutions per frame) per predetermined time (for example, one minute, one second, a frame interval), and the like. The input video is a video in time-series and has images of a plurality of frames. For example, the input video is a moving image obtained by photographing the state of a thrown ball. The input video may be photographed in advance or may be photographed in real time.

The object image generation unit 11 generates an object image which is an image of an object from the input video. The object image is, for example, a partial region in one frame image in the input video, which is segmented so that the entire object is included with the center of the object as the center of the image. The object image generation unit 11 segments a partial region from one frame image in the input video so as to form a rectangle of a size including the whole video of the object and including a margin of a known size in the periphery, and sets the partial region as the object image. As an example of the margin of the known size, the margin can be set to be 0.5 times the radius of the object. That is, it is conceivable that the object image is a square constituted of a side having a length three times the radius of the total object in a left margin of the object (0.5 times the radius of the object), the object (diameter 2 times the radius) and a right margin of the object and a side having a length three times the radius of the total object in an upper margin, the object and a lower margin of the object.

The object image generation unit 11 may generate an object image in which the feature of the object is extracted (the feature of the object is emphasized). For example, the object image generation unit 11 may obtain an image obtained by performing edge extraction on a partial region segmented from the input video as described above as an object image. Thus, the feature of the object can be extracted, and there is a merit that accuracy of following processing of the spin state estimation unit 13 is enhanced.

As described above, the input video is a time-series video, and the object image is also a time-series image. For example, when an object image is generated for each frame image of the input video, the object image also corresponds to each frame. The object image at the time point t is expressed as $O_t$. The time point t may be any time-series information corresponding to the time point, for example, real time or frame number. The generated object image is output to the spin state estimation unit 13.

<Spin State Estimation Unit 13 (Step S13)>

The object image generated by the object image generation unit 11 is input to the spin state estimation unit 13. The spin state estimation unit 13 uses a target estimation image $E_{t+w\cdot u}$ which an image of an object at a time point $t+w\cdot u$ obtained by spinning the object in an object image $O_t$ which is the image of the object at a time point t obtained from the input video in time-series as described above by w unit time on the basis of a hypothesis of spin state and an object image $O_{t+w\cdot u}$ at the time point $t+w\cdot u$ obtained from the input video, to estimate the spin state of the object by selecting a hypothesis of spin state and w in which likelihood of the target estimation image $E_{t+w\cdot u}$ becomes high from among a plurality of hypotheses of spin states and a plurality of w.

In other words, the spin state of the object is estimated by selecting the hypothesis of spin state and w among the plurality of hypotheses of spin states and the plurality of w so that the target estimation image $E_{t+w \cdot u}$ which is the image of the object at the time point t+w·u obtained by spinning the object in an object image $O_t$ which is the image of the object at a certain time point t obtained from the input video in time-series by w unit time on the basis of the hypothesis of spin state and the object image $O_{t+w \cdot u}$ at the time point t+w·u obtained from the input video are close together.

Here, the unit time u is a predetermined time interval. The unit time u may be a frame interval (that is, a time section between frames adjacent to each other), or may be a time section between frames separated by two or more, or may be another predetermined time section. In the following, an example in which the frame interval is the unit time u is explained as an example. In addition, w is an integer having an absolute value of 1 or more. That is, w is an integer satisfying w≤−1 or w≥1. When w is negative, spinning the object by w unit time on the basis of the hypothesis of spin state means that the object is spun by |w| unit times in the reverse spin direction of the spin direction indicated by the hypothesis of spin state (the object is brought into a state of going back by w unit time in the past). W may be limited to an integer of 1 or more, or may be limited to an integer of −1 or less. The upper limit of the absolute value of w is not limited, but the absolute value of w may be limited to a value equal to or less than the assumed spin period of the object. The hypothesis of spin state represents, for example, information r corresponding to the spin shaft of the object and information θ corresponding to the spin amount of the object.

Specific example of a step S13 will be described with reference to FIG. 3.

The spin state estimation unit 13 uses the target estimation image $E_{t+w \cdot u}$ and the object image $O_{t+w \cdot u}$ for each w belonging to a search range a≤w≤b of w, selects the hypothesis of spin state $(r_w, \theta_w)$ in which the likelihood of the target estimation image $E_{t+w \cdot u}$ becomes high from among the plurality of hypotheses of spin states (r, θ), and obtains each matching score s w (step S131). However, a<b is satisfied, a and b may be predetermined, set based on an input value, or automatically set based on other processing. Note that even when 0 is included in the search range a≤w≤b, the processing of the step S131 at w=0 is not required, but the processing of the step S131 may be performed for w=0. In addition, in order to select the hypothesis of spin state $(r_w, \theta_w)$ in which the likelihood of the target estimation image $E_{t+w \cdot u}$ becomes high for each w, for example, the method described in PTL 1 may be used. An overview of this method will be shown below.

«Example of Method for Selecting Hypothesis of Spin State $(r_w, \theta_w)$ of Each w»

When the method described in PTL 1 is used for selecting the hypothesis of spin state $(r_w, \theta_w)$ for each w, the spin state estimation unit 13 performs the following processing for each w belonging to the search range a≤w≤b.

First, the spin state estimation unit 13 generates a plurality (a plurality of types) of hypotheses of spin states (r, θ). The generated plurality of hypotheses is expressed by (r, θ)=(r (1), θ (1)), . . . , (r (J), θ (J)). Here, J is an integer of 2 or more. For example, the spin state estimation unit 13 generates the plurality of hypotheses (r (1), θ(1)), . . . , (r (J), θ (J)) on the basis of a probability distribution given in advance. Note that, in an initial state, since no prior information is generally present, the spin state estimation unit 13 generates the plurality of hypotheses (r (1), θ (1)), . . . , (r (J), θ (J)) on the basis of a probability distribution which is uniformly distributed (step S1311).

Figure 4:
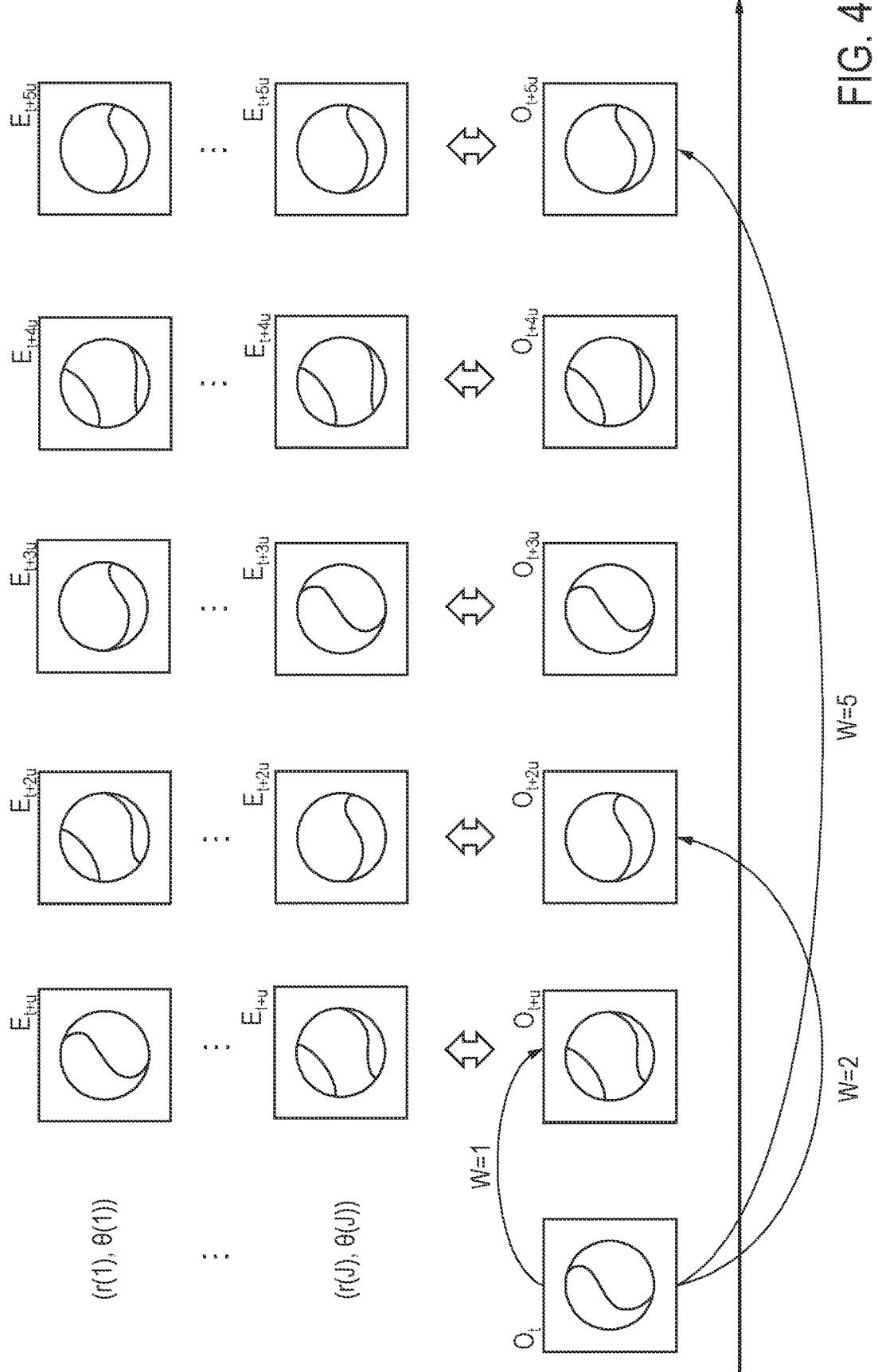
FIG. 4 is a diagram for the spin state estimation method of the embodiment.

The spin state estimation unit 13 generates the target estimation image $E_{t+w \cdot u}$ which is the image of the object at the time point t+w·u obtained by spinning the object in the object image $O_t$ by w unit time on the basis of the hypothesis of spin state (r (j), θ (j)) (j=1, . . . , J). That is, the spin state estimation unit 13 generates the target estimation image $E_{t+w \cdot u}$ corresponding to the hypothesis of each spin state (r (j), θ (j)) for each w belonging to the search range a≤w≤b. FIG. 4 shows a case where the search range satisfies 1≤w≤5. The straight arrow in FIG. 4 represents the flow of time. In this example, for each w satisfying 1≤w≤5, J target estimation images $E_{t+w \cdot u}$ corresponding to each of J hypotheses (r (1), θ (1)), . . . , (r (J), θ (J)). The spin state estimation unit 13 compares the target estimation image $E_{t+w \cdot u}$ corresponding to each hypothesis (r (j), θ (j)) with the object image $O_{t+w \cdot u}$ at a time point t+w·u obtained from the input video to verify the likelihood (the plausibility) of each hypothesis (r (j), θ (j)). For example, the spin state estimation unit 13 calculates the similarity between the target estimation image $E_{t+w \cdot u}$ and the object image $O_{t+w \cdot u}$, and sets the obtained similarity or the function value of the similarity as the likelihood of the hypothesis (r (j), θ (j)). Here, the similarity between the two images is, for example, an output value when the Euclidean distance of a corresponding sample in the two images is input to a predetermined non-increasing function. An example of the predetermined non-increasing function is f (x)=1/x. The spin state estimation unit 13 calculates the likelihood of the hypothesis (r (j), θ (j)) for each of the plurality of generated hypotheses. The spin state estimation unit 13 calculates the likelihood of the hypothesis for each of the plurality of generated hypotheses (r (1), θ (1)), . . . , (r (J), θ (J)) (step S1312).

The spin state estimation unit 13 determines whether the likelihoods of the calculated hypotheses (r (1), θ (1)), . . . , (r (J), θ (J)) satisfies a predetermined convergence condition. An example of the predetermined convergence condition is whether or not the magnitude of the difference between the maximum value of the likelihood of the hypothesis calculated last time and the maximum value of the likelihood of the hypothesis calculated this time is equal to or less than a predetermined threshold value. When the likelihood of the calculated hypothesis does not satisfy the predetermined convergence condition, the processing returns to the step S1311. In this case, in the step S1311, the spin state estimation unit 13 newly generates a plurality of hypotheses (r (1), θ (1)), . . . , (r (J), θ (J)) by random sampling based on a probability distribution of hypotheses determined by the likelihood calculated in the step S1312. On the other hand, when the likelihood of the calculated hypothesis satisfies the predetermined convergence condition, the spin state estimation unit 13 selects the hypothesis (r, θ)=$(r_w, \theta_w)$ in which the likelihood becomes high from current-calculated hypotheses (r (1), θ (1)), . . . , (r (J), θ (J)). For example, the spin state estimation unit 13 may select the hypothesis $(r_w, \theta_w)$ corresponding to the maximum value of the likelihood of the current-calculated hypotheses, the hypothesis $(r_w, \theta_w)$ in which the likelihood is equal to or more than the threshold value or exceeds the threshold value, or the hypothesis $(r_w, \theta_w)$ in which the likelihood is equal to or more than a reference order in descending order of the likelihood (step S1313) (description of «Example of Method for Selecting Hypothesis of Spin State $(r_w, \theta_w)$ of Each w» is completed).

When selecting the hypothesis of spin state ($r_w$ and $\theta_w$) of each w, the spin state estimation unit 13 further obtains a matching score $s_w$ between the target estimation image $E_{t+w\cdot u}$ corresponding to the selected hypothesis ($r_w$, $\theta_w$) and the object image $O_{t+w\cdot u}$ of each w. The matching score $s_w$ is an index representing similarity between the target estimation image $E_{t+w\cdot u}$ and the object image $O_{t+w\cdot u}$. For example, the likelihood of the hypothesis ($r_w$, $\theta_w$) obtained in the step S1312, that is, the similarity between the target estimation image $E_{t+w\cdot u}$ corresponding to the hypothesis ($r_w$, $\theta_w$) and the object image $O_{t+w\cdot u}$ may be used as the matching score s w as it is, a function value of the similarity may be used as the matching score s w, or the matching score s w is newly calculated from the target estimation image $E_{t+w\cdot u}$ corresponding to the hypothesis ($r_w$, $\theta_w$) and the object image $O_{t+w\cdot u}$. By performing the above-described processing for each w belonging to the search range a≤w≤b, the following list is obtained.

TABLE 1

| w | ($r_w$, $\theta_w$) | $s_w$ |
|---|---|---|
| a | ($r_a$, $\theta_a$) | $s_a$ |
| a + 1 | ($r_{a+1}$, $\theta_{a+1}$) | $s_{a+1}$ |
| . . . | . . . | . . . |
| b | ($r_b$, $\theta_b$) | $s_b$ |

The spin state estimation unit 13 selects a specific w on the basis of the matching score $s_a$, . . . , $s_b$ obtained as described above (step S132). That is, the spin state estimation unit 13 selects the specific w corresponding to a large matching score. For example, the spin state estimation unit 13 may select w corresponding to the maximum matching score among the matching scores $s_a$, . . . , $s_b$, may select w corresponding to the matching score which is equal to more than the threshold value or exceeds the threshold value among the matching scores $s_a$, . . . , $s_b$, or may select w corresponding to the matching score which is equal to or more than the reference order in the descending order among the matching scores $s_a$, . . . , $s_b$.

The spin state estimation unit 13 estimates the spin state of the object from the hypothesis ($r_w$, $\theta_w$) corresponding to the selected specific w, and outputs the estimation result (step S133). That is, the spin state estimation unit 13 estimates information corresponding to at least one of the spin shaft and the spin amount of the object from the hypothesis ($r_w$, $\theta_w$), and outputs the estimation result. For example, the spin state estimation unit 13 obtains information corresponding to at least one of the spin shaft and the spin amount per unit time of the object as the spin state of the object on the basis of information $r_w$ corresponding to the spin shaft of the object, information $\theta_w$ corresponding to the spin amount of the object, and w represented by the hypothesis of the selected spin state ($r_w$, $\theta_w$).

The same image as the object image $O_{t+w\cdot u}$ corresponding to the selected hypothesis ($r_w$, $\theta_w$) appears every spin period of the object. Therefore, only from the selected hypothesis ($r_w$, $\theta_w$), it is hard to completely specify the object image $O_{t+w\cdot u}$ is an image when the object represented in the object image $O_t$ is spun to what extent. In addition, the same image as the object image $O_{t+w\cdot u}$ appears even when the object spins in any direction around a certain spin shaft. Therefore, only from the selected hypothesis ($r_w$, $\theta_w$), it is hard to completely specify the object image $O_{t+w\cdot u}$ is an image when the object represented in the object image $O_t$ is spun in any direction.

Figure 5:
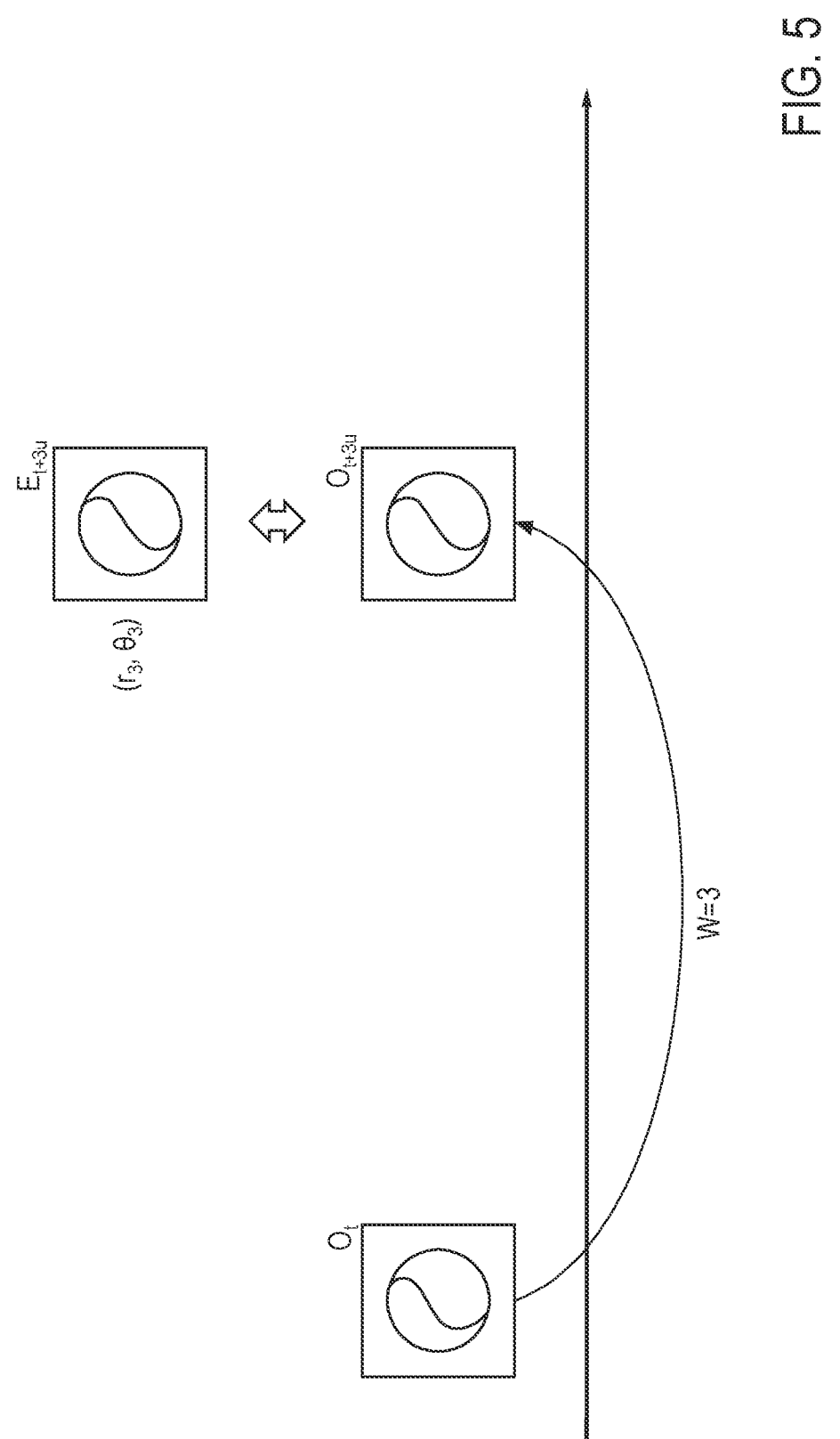
FIG. 5 is a diagram for the spin state estimation method of the embodiment.

FIG. 5 shows an example when w=3 is selected. In this case, the similarity between the target estimation image $E_{t+3\ u}$ corresponding to the hypothesis of the selected spin state ($r_3$, $\theta_3$) and the object image $\theta_{t+3\ u}$ is high. FIGS. 6A to 6C show the possibility of the spin state of the object in this case. Here, it is assumed that $r_3$ is the two-dimensional coordinate representing the spin shaft and the spin direction of the object, and $\theta_3$ is the angle representing the spin amount of the object. FIG. 6A shows an example in which the image of the object when the object represented in the object image $O_t$ is spun by an angle $\theta_3$ with respect to the spin shaft and the spin direction represented by $r_3$ becomes the object image $O_{t+3\ u}$. FIG. 6B shows an example in which the image of the object when the object represented in the object image $O_t$ is spun by an angle $\theta_3 + 2\ n\pi$ with respect to the spin shaft and the spin direction represented by $r_3$ becomes the object image $O_{t+3\ u}$. Here, n is an integer. FIG. 6C shows an example in which an image of the object when the object represented in the object image $O_t$ is spun by an angle $-\theta_3 + 2\ n\pi$ with respect to the spin shaft and the spin direction represented by $-r_3$ becomes the object image $O_{t+3\ u}$. Any of the object images $O_{t+3u}$ in FIGS. 6A to 6C becomes the same, and any of them has the high similarity with respect to the target estimation image $E_{t+3\ u}$ corresponding to the hypothesis of spin state ($r_3$, $\theta_3$) (FIG. 5).

That is, the spin state which can be estimated in the step S133 from only the hypothesis of spin state ($r_w$, $\theta_w$) corresponding to the specific w selected in the step S132 is as follows.

(1) The object is spun around the spin shaft corresponding to r w.

(2) The object spins by only $\Theta_w + 2\ n\pi$ or spins by only $-\Theta_w + 2\ n\pi$ during the w unit time. However, $\Theta_w$ represents the spin amount corresponding to $\theta_w$, and $\Theta_w = \theta_w$ is satisfied when $\theta_w$ represents the spin amount itself.

It can be estimated that the spin amount per unit time (the spin amount per frame) is $(\Theta_w + 2\ n\pi)/w$ or $(-\Theta_w + 2\ n\pi)/w$. In addition, the number of spins per minute, which is an example of information corresponding to the spin amount per unit time, is represented by $\{(\Theta_w + 2\ n\pi)/w\} * fr * 60/2\ \pi$ [rpm] or $\{(-\Theta_w + 2\ n\pi)/w\} * fr * 60/2\ \pi$ [rpm]. Here, fr [fps] represents the frame rate of the input video. For example, fr=120 or 480 are present.

Further, the spin state estimation unit 13 may estimate the spin state of the object by using other auxiliary information in addition to the hypothesis of spin state ($r_w$ and $\theta_w$) corresponding to the selected specific w. For example, when the range of the number of spins of the object and the kind of pitch which may be thrown are known in advance, this information may be used as the auxiliary information. Further, a sensor such as a Doppler sensor may be used to detect the kind of pitch, position, ball speed, and the like, and the detection result may be used as the auxiliary information.

Further, the kind of pitch may be extracted from the position change of the object in the input video and used as the auxiliary information.

Figure 7:
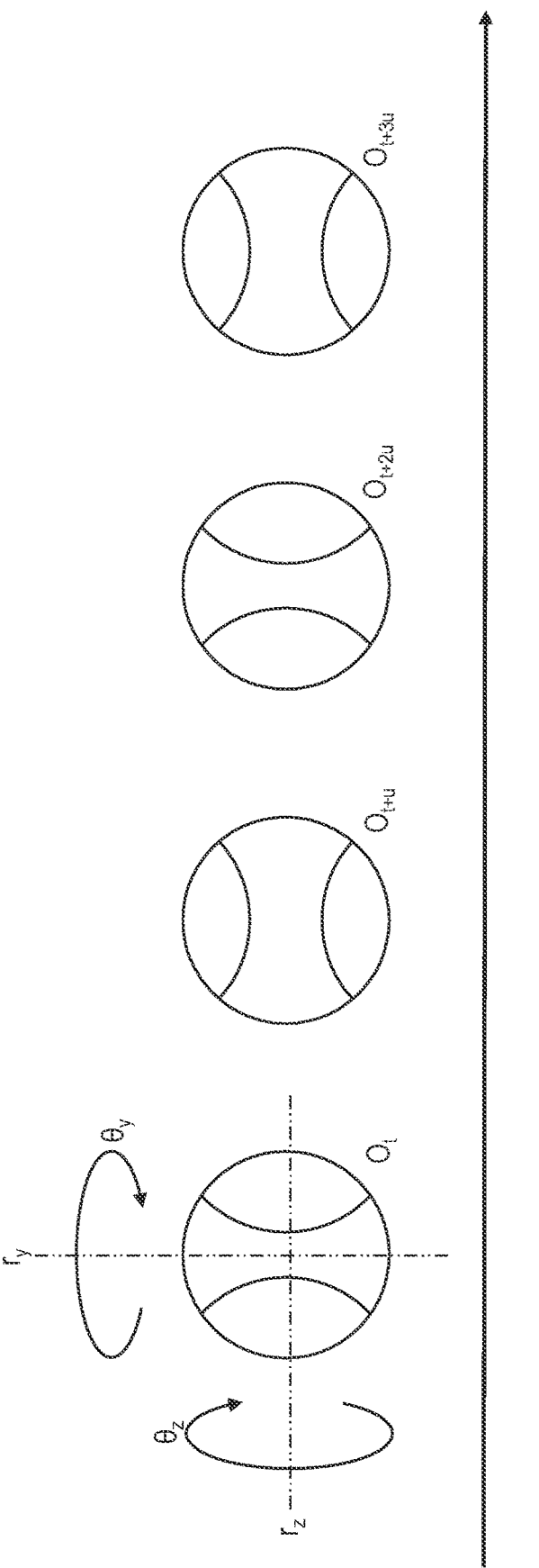
FIG. 7 is a diagram for explaining uncertainty of the spin state estimated in the embodiment.

Further, depending on the relationship between the frame rate of the input video and the spin amount of the object per unit time, there is a case where information corresponding to the spin shaft of the object cannot be obtained at all. For example, as exemplified in FIG. 7, when the spin amount per unit time u (the frame) of the object is $\pi + 2\ n\pi$, the object image $O_t$, $O_{t+u}$, $O_{t+2\ u}$, $O_{t+3\ u}$, at each time point t, t+u, t+2 u, t+3 u, . . . when the spin shaft of the object is $r_z$ and the object image $O_t$, $O_{t+u}$, $O_{t+2\ u}$, $O_{t+3\ u}$, . . . at each time point t, t+u, t+2 u, t+3 u, . . . when the spin shaft of the object is $r_y$ which is orthogonal to $r_{qz}$ are identical each other. In such a case, the spin state estimation unit 13 cannot estimate the correct direction of the spin shaft. Therefore, when the spin amount per unit time u obtained from the hypothesis of spin state $(r_w, \theta_w)$ corresponding to the selected specific w is n+2 nπ, the spin state estimation unit 13 does not estimate information corresponding to the spin shaft of the object as the spin state of the object and may estimate only the information corresponding to the number of spins of the object and output the estimation result. That is, when the spin amount per unit time obtained based on information $\theta_w$ corresponding to the spin amount of the object represented by the hypothesis of selected spin state and w is π+2 nπ, the spin state estimation unit 13 may obtain information including information corresponding to the spin amount per unit time and not including information corresponding to the spin shaft of the object as the spin state of the object, and output the estimation result. In other words, when the spin amount per unit time obtained on the basis of the information $\theta_w$ corresponding to the spin amount of the object represented by the hypothesis of selected spin state and w is not π+2 nπ, the spin state estimation unit 13 may obtain information including information corresponding to the spin shaft of the object as the spin state of the object and output the estimation result. Alternatively, when the spin amount per unit time u is π+2 nπ, the spin state estimation unit 13 may not estimate information corresponding to the spin shaft of the object as the spin state of the object and output the effect that the information corresponding to the spin shaft of the object cannot be estimated.

Features of Present Embodiment

In the present embodiment, the spin state estimation unit 13 uses the target estimation image $E_{t+w \cdot u}$ which is the image of the object at the time point t+w·u when the object in the object image $O_t$ which is the image of the object at the certain time point t obtained from the input video in time-series is spun by w unit time on the basis of the hypothesis of spin state and the object image $O_{t+w \cdot u}$ at the time point t+w·u obtained from the input video, to estimate the spin state of the object by selecting the hypothesis of spin state and w in which the likelihood of the target estimation image $E_{t+w \cdot u}$ becomes high among the plurality of hypotheses of spin states and the plurality of w. Thus, even when the target estimation image $E_{t+w \cdot u}$ in which the object in the object image $O_t$ is spun by w unit time on the basis of the hypothesis of spin state for any of w (for example, w=1 is satisfied) cannot be generated, the target estimation image $E_{t+w \cdot u}$ can be generated for the other w, and the spin state of the object can be estimated by selecting the optimum w. As a result, in the present embodiment, the spin state of the object can be estimated regardless of the frame rate of the input video.

Figure 3:
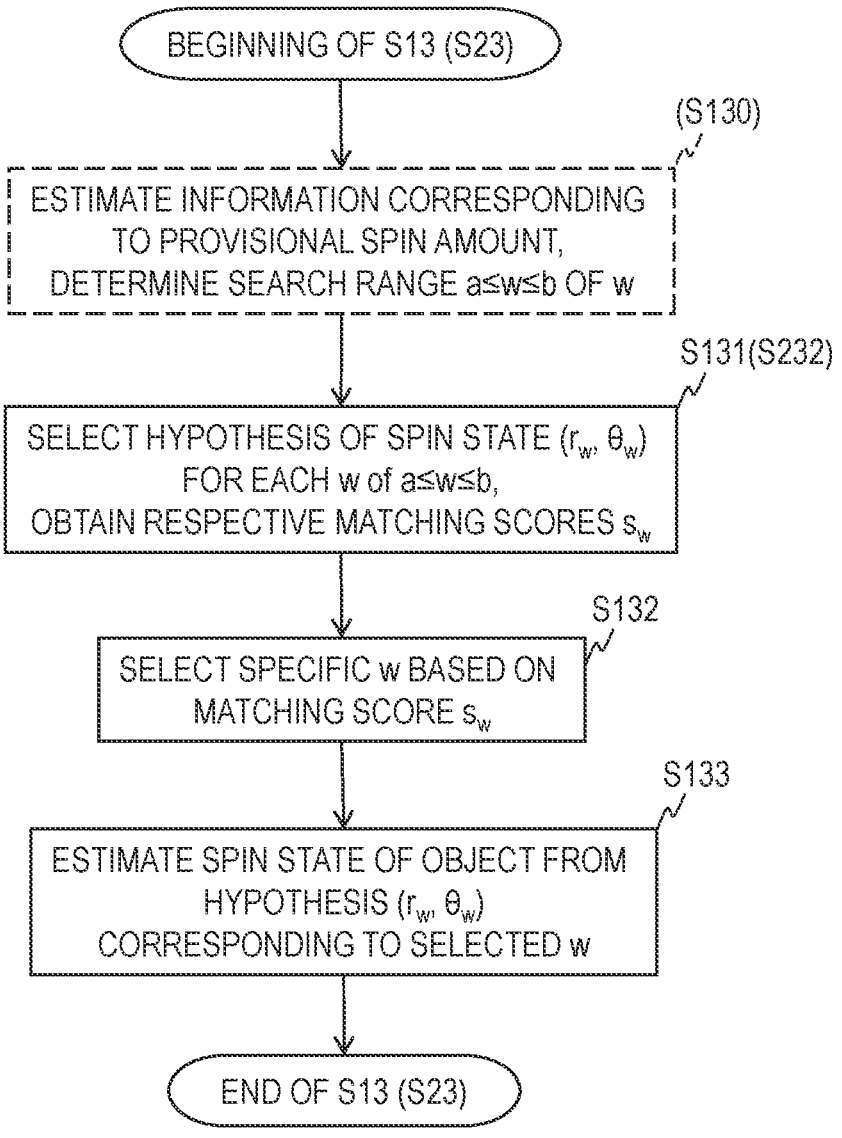
FIG. 3 is a flow diagram for exemplifying a spin state estimation processing of the embodiment.

Note that, in FIG. 3, an example in which the spin state estimation unit 13 selects the hypothesis $(r_w, \theta_w)$ of the optimum spin state for each w of a≤w≤b, and obtains respective matching scores $s_w$ (step S131), selects the specific w from the search range of a≤w≤b on the basis of the matching score $s_w$ (step S132), and estimates the spin state of the object on the basis of the hypothesis $(r_w, \theta_w)$ corresponding to the selected w is shown. However, this does not limit the present invention, and the spin state estimation unit 13 may select the optimum hypothesis $(r_w, \theta_w)$ from among the plurality hypotheses $(r_w, \theta_w)$ of spin states for all w of the search range a≤w≤b and estimate the spin state of the object on the basis of the hypothesis $(r_w, \theta_w)$. That is, if the spin state of the object is estimated by using the target estimation image $E_{t+w \cdot u}$ and the object image $O_{t+w \cdot u}$, and selecting the hypothesis of spin state and w in which the likelihood of the target estimation image $E_{t+w \cdot u}$ becomes high from among the plurality of hypotheses of spin states and the plurality of w, the processing process may be any process. In other words, if the spin state of the object is estimated by selecting the hypothesis and w of the spin state in which the target estimation image $E_{t+w \cdot u}$ and the object image $O_{t+w \cdot u}$ are close to each other from among the plurality of hypotheses of spin states and the plurality of w, the processing process may be any process. Note that the hypothesis of spin state and w in which the likelihood of the target estimation image becomes high may be, for example, a hypothesis of spin state and w in which the likelihood of the target estimation image becomes the maximum under some conditions, may be a hypothesis of spin state and w in which the likelihood becomes equal to or more than a threshold value or exceeds the threshold value, or may be a hypothesis of spin state and w in which the order of the likelihood in descending order is higher than the reference order. In addition, the hypothesis of spin state and w in which the target estimation image $E_{t+w \cdot u}$ and the object image $O_{t+w \cdot u}$ are close to each other may be a hypothesis of spin state and w in which the similarity between the target estimation image $E_{t+w \cdot u}$ and the object image $O_{t+w \cdot u}$ is the maximum under some conditions, may be a hypothesis of spin state and w in which the similarity is equal to or more than the threshold value or exceeds the threshold value, or may be a hypothesis of spin state and w in which the order of the similarity in descending order is higher than the order of the reference.

Modification Example 1 of First Embodiment

As a general tendency, as the absolute value of w increases, it is expected that the estimation accuracy of the spin state is improved. A detailed description will be given below. An error (noise) is defined as e when the spin state of the object is estimated by using the target estimation image $E_{t+w \cdot u}$ and the object image $O_{t+w \cdot u}$ and selecting the hypothesis of spin state in which the likelihood of the target estimation image $E_{t+w \cdot u}$ becomes high. Here, it is assumed that the magnitude of e does not depend so much on the magnitude of the absolute value of w. For example, it is assumed that e is not so changed as a whole in both the case of w=1 and the case of w=12. Therefore, it is assumed that the error per estimation of the spin state is e regardless of the value of w. Here, assuming that the true spin amount of the object per unit time u (one frame interval) is θ, the number of spins per minute [rpm] of the object estimated as w=1 and w=12 are as follows.

When it is estimated as w=1:

$$(\theta+e)*fr*60/2\ \pi = \theta*fr*60/2\pi + e*fr*60/2\ \pi$$

When it is estimated as w=12:

$$\{(\theta*12+e)/12\}*fr*60/2\ \pi = \theta*fr*60/2\pi + (e/12)*fr*60/2\ \pi$$

As described above, it is understood that the error per unit time $((e/12)*fr*60/2\ \pi)$ in the case of w=12 is decreased to $\frac{1}{12}$ with respect to the error per unit time $(e*fr*60/2\ \pi)$ in the case of w=1. In general, it is expected that the error per unit time in the case of w=c (where, c satisfies a≤c≤b and is an integer, a<b and c≠0 are established) becomes about 1/|c| of the error per unit time in the case of w=1. Therefore, as the absolute value of w becomes larger, the estimation accuracy of the spin state is expected to be improved.

For this reason, the search range a≤w≤b may be limited so that the absolute value of w becomes large. For example, the absolute value of w may be limited to 2 or more. That is, the absolute value of w is an integer of 2 or more and u is the unit time, the spin state estimation unit 13 may use the target estimation image which is the image of the object at the time point $t+w \cdot u$ obtained by spinning the object in the object image which is the image of the object at the time point t obtained from the input video of the plurality of frames in time-series by w unit time on the basis of the hypothesis of spin state and the object image at the time point $t+w \cdot u$ obtained from the input video, to estimate the spin state of the object by selecting the hypothesis of spin state and w in which the likelihood of the target estimation image becomes high from among the plurality of hypotheses of spin state and a plurality of w whose absolute values are two or more. Thus, it is possible to improve the accuracy of estimating the spin state as compared with the case where w=1 may be selected as in the first embodiment.

Modification Example 2 of First Embodiment

As exemplified in FIG. 3, the spin state estimation unit 13 may estimate the spin state of the object by estimating information corresponding to the provisional spin amount of the object in a prior processing (step S130) and respectively selecting the hypothesis of spin state and w in which the likelihood of the target estimation image becomes high from among the plurality of hypotheses of spin states and the search range $a \le w \le b$ of w based on the information corresponding to the provisional spin amount in the following spin state estimation processing (steps S131 to S133).

The spin state estimation processing is the same as that of the first embodiment or the modification example 1 of the first embodiment. The information corresponding to the provisional spin amount is, for example, an angle and the number of spins representing the spin amount of the object, the number of spins (for example, per one minute, per one second, per one frame) per a predetermined time (for example, one minute, one second, a frame interval), and the like. The prior processing (step S130) is exemplified below.

Known processing described in PTL 1, NPL 1, and the like.

Processing in which w is limited to a predetermined value (for example, w=1) or a range in the first embodiment.

Processing in which the processing described in the first embodiment is performed by using an input video having a different frame rate from that of the input video used in the spin state estimation processing (steps S131 to S133) (for example, a input video (for example, 480 fps) which has a higher frame rate than that of the input video (for example, 120 fps) used in the spin state estimation processing or an input video having a lower frame rate than that of the input video used in the spin rate estimation processing).

Processing in which the method described in the first embodiment is performed by using an input video having a different frame rate from that of the input video used in the spin state estimation processing (steps S131 to S133), and limiting w to a predetermined value or range.

The search range $a \le w \le b$ of w based on the information corresponding to the provisional spin amount may be any one as long as the search range $a \le w \le b$ is based on the information corresponding to the provisional spin amount. For example, the number of frames required for one spin of the object obtained from the information corresponding to the provisional spin amount is defined as $W_{tmp}$, and the range including $W_{tmp}$ may be defined as the search range $a \le w \le b$. For example, the spin state estimation unit 13 may define the spin angle of the object in one frame interval from the information corresponding to the provisional spin amount as $\theta_r$ [radian], obtain $W_{tmp} = 2\pi/\theta_r$, and determine the search range $a \le w \le b$ as any of the following. Here, N is a positive integer, d1, d2 are positive real numbers satisfying $d_1 < d_2$ (for example, $d_1 = 0.7$, and $d_2 = 1.3$), and V is an integer of 2 or more.

$W_{tmp} - N \le w \le W_{tmp} + N$ is defined as a search range $a \le w \le b$.

$W_{tmp} * d_1 \le w \le W_{tmp} * d_2$ is defined as a search range $a \le w \le b$.

$(a, b) = (a_v, b_v)$ is defined with respect to each real number section $CL_v$ (here, $v=1, \ldots, V$) of the real number sections $CL_1, \ldots, CL_v$ and $a_i \le w \le b_i$ corresponding to the real number section $CL_i$ to which $W_{tmp}$ belongs (here, $i \in \{1, \ldots, V\}$) is defined as a search range $a \le w \le b$ of w.

Second Embodiment

The technique of the first embodiment and its modification examples 1 and 2 uses the target estimation image $E_{t+w \cdot u}$ at the time point $t+w \cdot u$ obtained by spinning the object in the object image $O_t$ at the time point t by w unit time on the basis of the hypothesis of spin state and the object image $O_{t+w \cdot u}$ at the time point $t+w \cdot u$, to estimate the spin state of the object by selecting the hypothesis of spin state and w in which the likelihood of the target estimation image $E_{t+w \cdot u}$ becomes high. That is, the spin state of the object is estimated on the basis of two images of the object image $O_t$ at a certain time t and the object image $O_{t+w \cdot u}$ at the time $t+w \cdot u$. On the other hand, as this processing, the spin state of the object is estimated based of 2K images of the object images $O_{t1}, O_{t2}, \ldots, O_{tK}$ at a plurality of time points $t_1, t_2, \ldots, t_K$ and the object images $O_{t1+w \cdot u}, O_{t2+w \cdot u}, \ldots, O_{tK+w \cdot u}$ at a plurality of time points $t_1+w \cdot u, t_2+w \cdot u, \ldots, t_K+w \cdot u$. Here, K is an integer of 2 or more. For example, $t_1 \ne t^2 \ldots \ne t_K$ is established and $t_{k+1} = t_k + u$ is established. Note that, although "t $\alpha$" of the subscript with the lower part (where, $\alpha = 1, \ldots, K$) should be originally described as "$t_\alpha$", due to the restriction of the description, it is described as "t $\alpha$".

That is, the spin state estimation unit 13 may use the target estimation images $E_{t1+w \cdot u}, E_{t2+w \cdot u}, \ldots, E_{tK+w \cdot u}$ of the images of the object at the time points $t_1+w \cdot u, t_2+w \cdot u, \ldots, t_K+w \cdot u$ obtained by spinning the object in the object images $O_{t1}, O_{t2}, \ldots, O_{tK}$ at the time points $t_1, t_2, \ldots, t_K$ obtained from the input video by w unit time on the basis of the hypothesis of spin state of the object and the object images $O_{t1+w \cdot u}, O_{t2+w \cdot u}, \ldots, O_{tK+w \cdot u}$ at the time points $t_1+w \cdot u, t_2+w \cdot u, \ldots, t_K+w \cdot u$ obtained from the input video wherein K is an integer of 2 or more, to estimate the spin state of the object by respectively selecting the hypothesis of spin state and w in which the likelihood of the target estimation images $E_{t1+w \cdot u}, E_{t2+w \cdot u}, \ldots, E_{tK+w \cdot u}$ become high among the plurality of hypotheses of spin state and the plurality of w.

In other words, the spin state estimation unit 13 may use the target estimation images $E_{t1+w \cdot u}, E_{t2+w \cdot u}, \ldots, E_{tK+w \cdot u}$ and the object images $O_{t1+w \cdot u}, O_{t2+w \cdot u}, \ldots, O_{tK+w \cdot u}$, to estimate the spin state of the object by selecting the hypothesis of spin state and w in which the target estimation images $E_{t1+w \cdot u}, E_{t2+w \cdot u}, \ldots, E_{tK+w \cdot u}$ and the object images $O_{t1+w \cdot u}, O_{t2+w \cdot u}, \ldots, O_{tK+w \cdot u}$ are close to each other among the plurality of hypotheses of spin states and the plurality of w.

In this way, by estimating the spin state of the object on the basis of 2K images of the object images $O_{t1}, O_{t2}, \ldots, O_{tK}$ and the object image $O_{t1+w \cdot u}, O_{t2+w \cdot u}, \ldots, O_{tK+w \cdot u}$, the influence of variation in features of the object appearing in the image is reduced and estimation accuracy can be improved compared with estimation of the spin state of the object on the basis of the two images.

Figure 2:
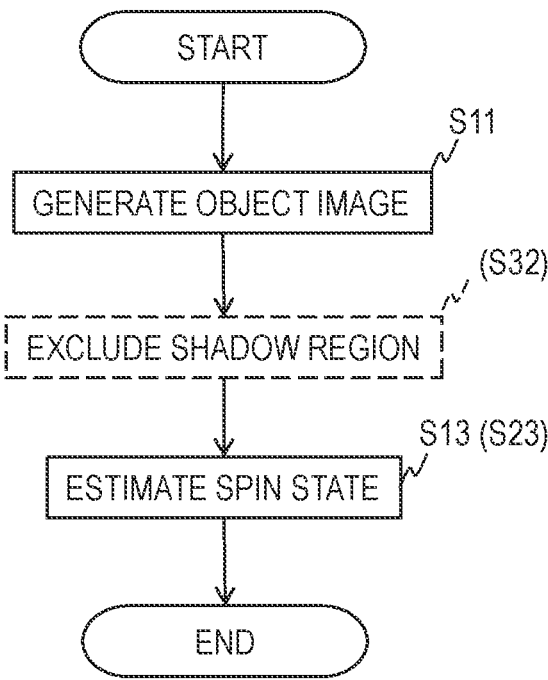
FIG. 2 is a flow diagram for exemplifying a spin state estimation method of the embodiment.

As exemplified in FIG. 1, the spin state estimation device 2 according to the present embodiment includes, for example, the object image generation unit 11 and a spin state estimation unit 23. The spin state estimation method according to the present embodiment, as exemplified in FIG. 2, is realized by each constituent unit of the spin state estimation device 1 performing the processing in steps S11 and S23 described below. This will be described in detail below.

<Object Image Generation Unit 11 (Step S11)>

The processing of step S11 by the object image generation unit 11 is the same as that of the first embodiment. However, the object image generated in the step S11 is output to the spin state estimation unit 23.

<Spin State Estimation Unit 23 (Step S23)>

Figure 8:
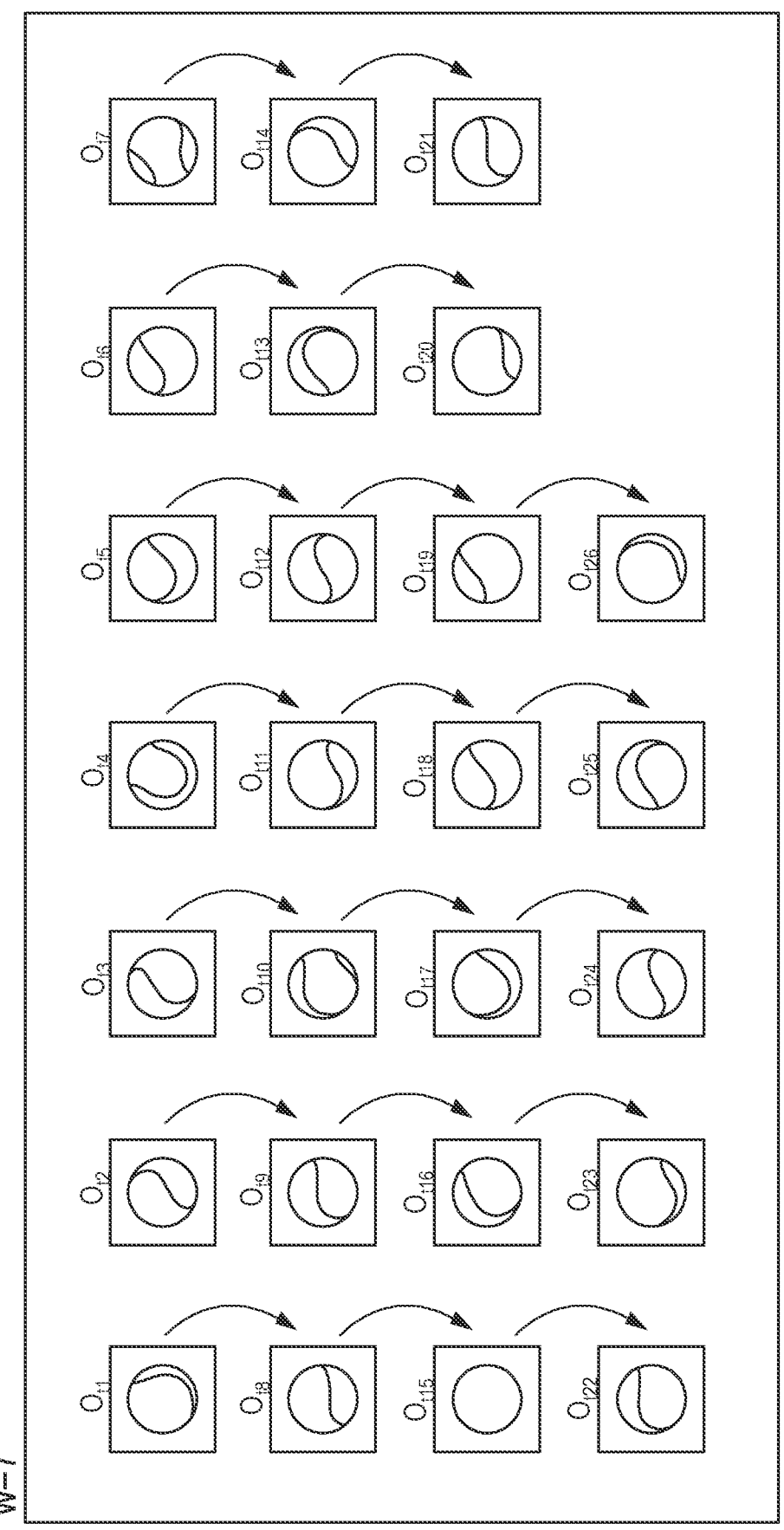
FIG. 8 is a diagram for exemplifying the spin state estimation method of the embodiment.
Figure 9:
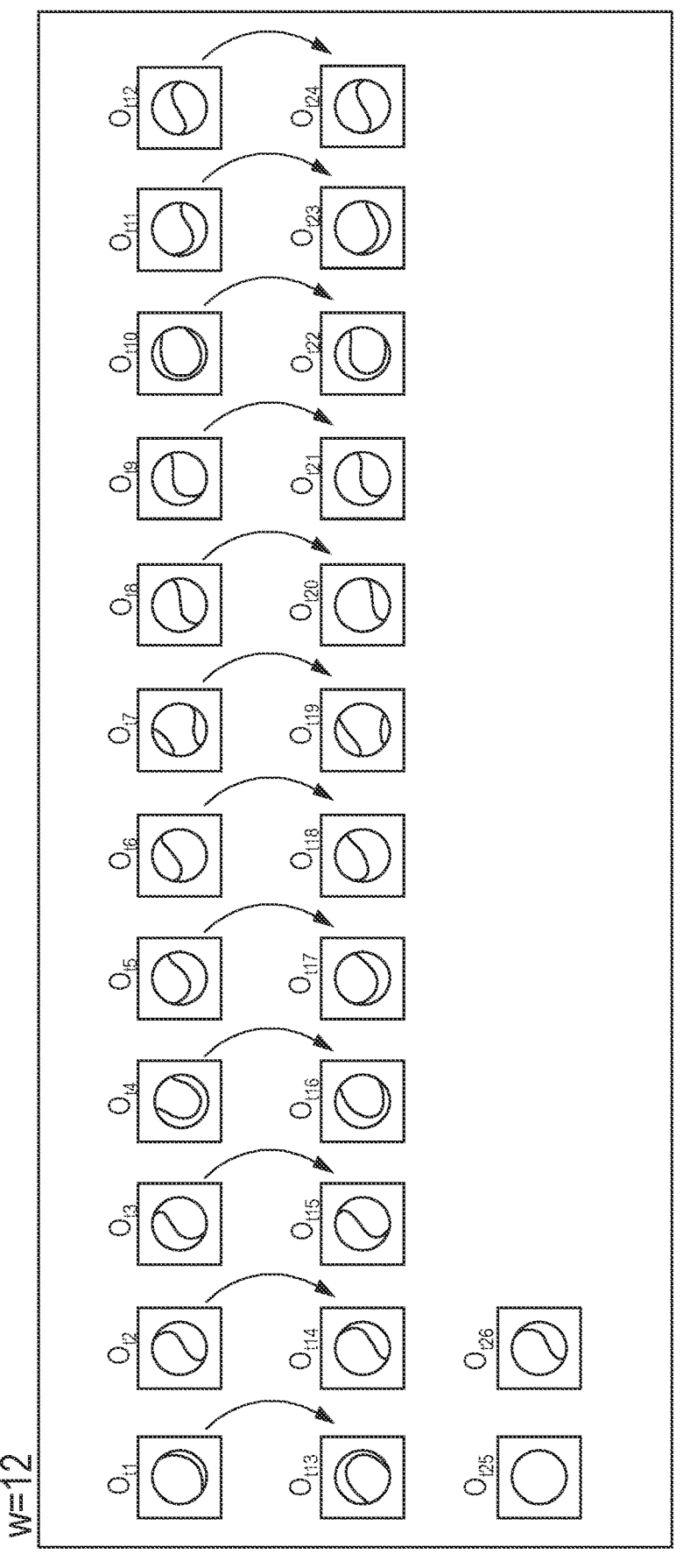
FIG. 9 is a diagram for exemplifying the spin state estimation method of the embodiment.

The object image generated by the object image generation unit 11 is input to the spin state estimation unit 23. The spin state estimation unit 23, as mentioned above, uses the target estimation images $E_{t1+w \cdot u}, E_{t2+w \cdot u}, \ldots, E_{tK+w \cdot u}$ which are the images of the object at the time points $t_1+w \cdot u$, $t_2+w \cdot u, \ldots, t_K+w \cdot u$ obtained by spinning the object in the object images $O_{t1}, O_{t2}, \ldots, O_{tK}$ at the time points $t_1$, $t_2, \ldots, t_K$ obtained from the input video and the object images $O_{t1+w \cdot u}, O_{t2+w \cdot u}, \ldots, O_{tK+w \cdot u}$ at the time points $t_1+w \cdot u, t_2+w \cdot u, \ldots, t_K+w \cdot u$ obtained from the input video on the basis of the hypothesis of spin state, to estimate the spin state of the object by respectively selecting the hypothesis of spin state and w in which the likelihood of the target estimation images $E_{t1+w \cdot u}, E_{t2+w \cdot u}, \ldots, E_{tK+w \cdot u}$ becomes high among the plurality of hypotheses of spin states and the plurality of w, and outputs the estimation result. FIG. 8 exemplifies, when w=7 is satisfied, the relationship between the object image $O_{t1}, O_{t2}, \ldots, O_{tK}$, and the object image $O_{t1+w \cdot u}, O_{t2+w \cdot u}, \ldots, O_{tK+w \cdot u}$, and FIG. 9 exemplifies, when w=12 is satisfied, the relationship between the object image $O_{t1}, O_{t2}, \ldots, t_K$, and the object image $O_{t1+w \cdot u}$, $O_{t2+w \cdot u}, \ldots, O_{tK+w \cdot u}$. However, in FIGS. 8 and 9, $t_{k+w}=t_k+w \cdot u$ (where, k=1, . . . , K) is established. The difference between the step S23 and the step S13 is that the likelihood of the target estimation image $E_{t+w \cdot u}$ in the step S13 is replaced with the likelihood of the target estimation image $E_{t1+w \cdot u}, E_{t2+w \cdot u}, \ldots, E_{tK+w \cdot u}$. An example of the likelihood of the target estimation images $E_{t1+w \cdot u}, E_{t2+w \cdot u}, \ldots, E_{tK+w \cdot u}$ is the total value, the average value, the maximum value, the minimum value, and the like of the likelihood of the target estimation images $E_{t1+w \cdot u}, E_{t2+w \cdot u}, \ldots, E_{tK+w \cdot u}$. In other words, in the step S13, the hypothesis of spin state and w in which the target estimation image $E_{t+w \cdot u}$ and the object image $O_{t+w \cdot u}$ are close to each other is selected and the spin state of the object is estimated, however, in the step S23, the hypothesis of spin state and w in which the target estimation images $E_{t1+w \cdot u}, E_{t2+w \cdot u}, \ldots, E_{tK+w \cdot u}$ and the object image $O_{t1+w \cdot u}, O_{t2+w \cdot u}, \ldots, O_{tK+w \cdot u}$ are close to each other is selected and the spin state of the object is estimated. What the target estimation images $E_{t1+w \cdot u}, E_{t2+w \cdot u}, \ldots, E_{tK+w \cdot u}$ and the object images $O_{t1+w \cdot u}, O_{t2+w \cdot u}, \ldots, O_{tK+w \cdot u}$ are close to each other may be that any of the total value, the average value, the maximum value, the minimum value or the like of the similarity between the target estimation image $E_{tK+w \cdot u}$ and the object image $O_{tK+w \cdot u}$ (where, k=1, . . . , K) becomes maximized under some conditions, any of them becomes equal to more than a threshold value or exceeds the threshold value, or the order of the total value, the average value, the maximum value, the minimum value or the like of the similarity in descending order is higher than the reference order. For example, the spin state estimation unit 23 uses the target estimation image $E_{t1+w \cdot u}, E_{t2+w \cdot u}, \ldots, E_{tK+w \cdot u}$ and the object image $O_{t1+w \cdot u}, O_{t2+w \cdot u}, \ldots, O_{tK+w \cdot u}$ for w belonging to the search range a≤w≤b of w, selects the hypothesis of spin state $(r_w, \theta_w)$ in which the likelihood of the target estimation image $E_{t+w \cdot u}$ becomes high from among the plurality of hypotheses (r, θ) of spin state, and obtain respective matching scores $s_w$ (step S231). Thereafter, the spin state estimation unit 23 performs the processing of steps S132 and S133 described in the first embodiment. The other is the same as that in the first embodiment.

Features of Present Embodiment

Also in the present embodiment, the spin state of the object can be estimated regardless of the frame rate of the input video, as in the first embodiment. Furthermore, in the present embodiment, the spin state of the object is estimated on the basis of 2K images of the object images $O_{t1}$, $O_{t2}, \ldots, O_{tK}$ and the object images $O_{t1+w \cdot u}, O_{t2+w \cdot u}, \ldots,$ $O_{tK+w \cdot u}$, so that estimation accuracy can be improved more than estimation of spin state of the object on the basis of the two images.

Modification Example 1 of Second Embodiment

As in the modification example 1 of the first embodiment, the search range a≤w≤b may be limited in the second embodiment so that the absolute value of w becomes large. For example, the absolute value of w may be limited to 2 or more.

Modification Example 2 of Second Embodiment

Similarly to the modification example 2 of the first embodiment, in the second embodiment, the spin state estimation unit 23 estimates information corresponding to the provisional spin amount of the object in the pre-processing (step S130), and in the following spin state estimation processing (steps S231, S132 and S133), the spin state of the object may be estimated by selecting the hypothesis of spin state and w in which the likelihood of the target estimation image becomes high from among the plurality of hypotheses of spin states and the search range a≤w≤b of w based on information corresponding to the provisional spin amount, respectively.

Third Embodiment

Figure 10:
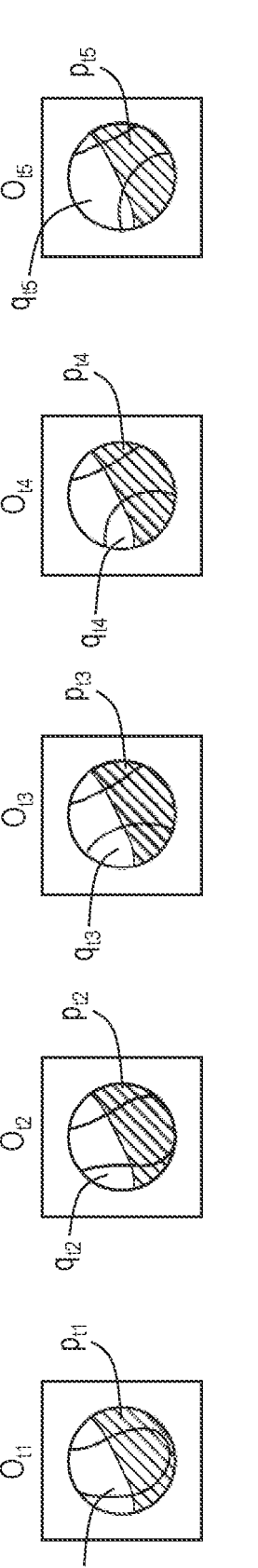
FIG. 10 is a diagram for exemplifying a shadow appearing on a sphere.
Figure 10:

FIG. 10 exemplified the object images in time-series $O_{t1}$, $O_{t2}, O_{t3}, O_{t4}, O_{t5}, \ldots$. Note that the straight arrows in FIG. 10 represent the flow of time. As exemplified in FIG. 10, when strong light such as sunlight is applied to the object, in the object images $O_{t1}, O_{t2}, O_{t3}, O_{t4}, O_{t5}, \ldots$, a pixel value (luminance) of parts $q_{t1}, q_{t2}, q_{t3}, q_{t4}, q_{t}s, \ldots$ to which the light directly is applied is greatly different from that of parts $p_{t1}, p_{t2}, p_{t3}, p_{t4}, p_{t5}, \ldots$ that becomes the shadow part. In such a case, it becomes very difficult to estimate the spin state of the object based on the texture (for example, the seam of the ball) which the object originally has. For this reason, it is conceivable to perform processing for extracting features of an object such as edge extraction, and estimate the spin state by using the object image from which the features of the object are extracted.

Figure 11B:
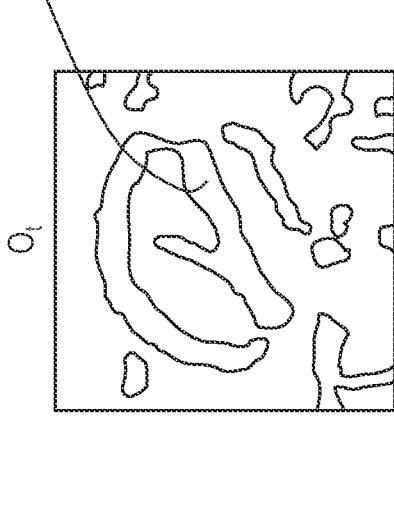
FIG. 11B is a diagram for exemplifying an edge region extracted from a video exemplified in FIG. 11A.
Figure 11A:
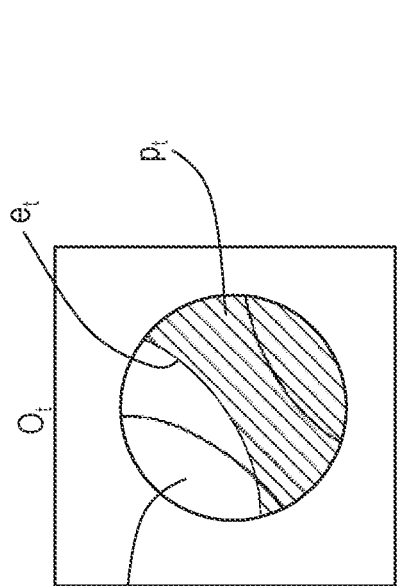
FIG. 11A is a diagram for exemplifying a video of the sphere on which the shadow appears.
Figure 11C:
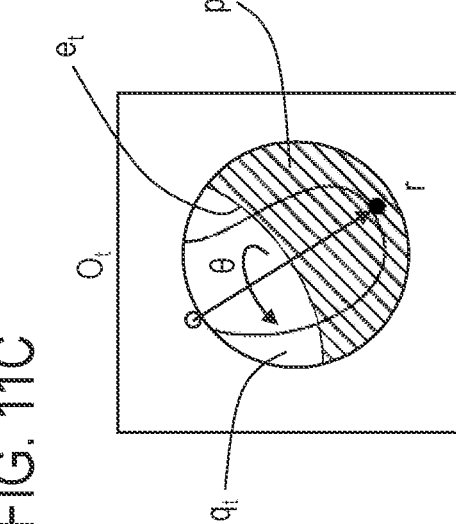
FIG. 11C is a diagram for exemplifying the spin state estimated from the video exemplified in FIG. 11A.

However, in such a case, when processing for extracting features of the object such as edge extraction is performed, features of a boundary part between the part directly irradiated with light and the part becoming a shadow are extracted, and the spin state of the object may not be correctly estimated. For example, when edge extraction of the object image $O_t$ exemplified in FIG. 11A is performed, an object image $O_t$ representing an edge region $E_t$ as shown in FIG. 11B is obtained. As exemplified in FIGS. 11A and 11B, it can be understood that the edge region $E_t$ represents not only the features of the edge of the object (the ball) and the texture which the object originally has (for example, the seam of the ball), but also the features of the boundary part e t between the part $q_t$ to which the light is directly applied and the par $p_t$ to be the shadow. As also exemplified in FIG. 10, in the object images $O_{t1}$, $O_{t2}$, $O_{t3}$, $O_{t4}$, $O_{t5}$, . . . , the parts $p_{t1}$, $p_{t2}$, $p_{t3}$, $p_{t4}$, $p_{t5}$, . . . that becomes the shadow hardly change with the passage of time, and the boundary parts $e_{t1}$, $e_{t2}$, $e_{t3}$, $e_{t4}$, $e_{t5}$, . . . also hardly change with the passage of time. Therefore, when the spin state is estimated from the object image $O_t$ representing the edge region $e_t$ as shown in FIG. 11B, it is estimated that the object is spinning along the boundary part $e_t$ as shown in FIG. 11C, and it may be erroneously estimated that the object is spinning by a spin amount $\theta$ around a spin shaft r perpendicular to the boundary part $e_t$.

In this regard, although a method of removing a shadow from the object image by a known image processing technique can be considered, it is difficult to appropriately determine whether or not the shadow is present in an object image obtained based on the input video photographed in various environments different in the position of the sun, weather, and the like, and there are many cases where the shadow cannot be sufficiently removed. Also, a method of not using pixels in a predetermined fixed region of the object image for estimating the spin state may be considered. However, the positions of the shadows and boundary parts are different depending on the environment such as the position of the sun, and an appropriate fixed region cannot be set in an object image obtained based on the input video photographed in various environments.

Therefore, in the present embodiment, the spin state estimation device estimates the spin state of the object by using an object image obtained by excluding at least a part of a region common to a plurality of frames from an image corresponding to the object obtained from the input video of the plurality of frames in time-series. The image corresponding to the object may be an image of the object or an image obtained by extracting features of the object. An example of an image obtained by extracting features of an object is an image obtained by performing edge extraction of the object. An example of an image obtained by performing edge extraction of the object is an image in which a pixel value of an edge region of the object is pix 1 (for example, a pixel value representing black), and a pixel value other than the edge region is pix 2 (for example, a pixel value representing white). Preferably, the spin state of the object is estimated by using the object image obtained by excluding at least a part of the region common to the plurality of frames from the image obtained by extracting the features of the object from the input video. Although the positions of the shadows and boundary parts are different depending on the photographing environment as described above, the positions of the shadows and boundary parts of the images of the objects obtained from the same input video are hardly changed as exemplified in FIG. 10. On the other hand, the texture of the object (for example, the seam of the ball, etc.) changes in accordance with the spin of the object. Therefore, by estimating the spin state by using the object image obtained by excluding at least a part of the region common to the plurality of frames, the influence of the shadow and the boundary part can be automatically reduced. Note that the "at least a part of the region common to the plurality of frames" to be excluded may be all or a part of the region common to the plurality of frames, but the former is more preferable. Further, if "at least a part of a region common to a plurality of frames" is excluded, a region including the region and other regions may be excluded. That is, the region including "at least a part of the region common to the plurality of frames" may be excluded. This will be described in detail below.

As exemplified in FIG. 1, the spin state estimation device 3 of the present embodiment includes, for example, the object image generation unit 11, a shadow region exclusion unit 32, and the spin state estimation unit 13 (or the spin state estimation unit 23). As exemplified in FIG. 2, the spin state estimation method of the present embodiment is realized, for example, by each constituent unit of the spin state estimation device 3 performing steps S11, S32, and S13 (or S23) explained below.

<Object Image Generation Unit 11 (Step S11)>

The processing of step S11 by the object image generation unit 11 is the same as that of the first embodiment. However, the object image generated in the step S11 is output to the shadow region exclusion unit 32.

<Shadow Region Exclusion Unit 32 (Step S32)>

The object image output from the object image generation unit 11 is input to the shadow region exclusion unit 32. As described above, the object image may be an image segmented from the input video or an image obtained by extracting features of the object. The shadow region exclusion unit 32 obtains and outputs an object image obtained by excluding at least a part of a region common to a plurality of frames from the input object image (the image corresponding to the object obtained from the input video of the plurality of frames in time-series).

Figure 12:
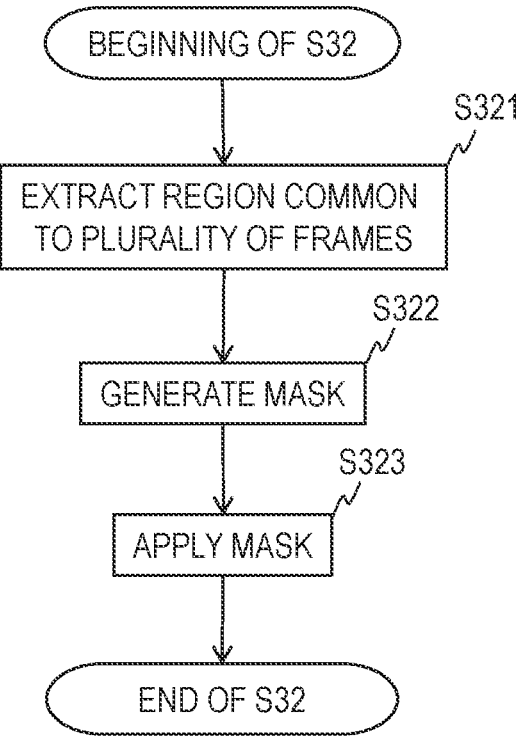
FIG. 12 is a flow diagram for exemplifying a shadow region exclusion processing of the embodiment.

FIG. 12 exemplifies a processing of a step S32.

As exemplified in FIG. 12, the shadow region exclusion unit 32 extracts a region common to a plurality of frames from the object image of the plurality of input frames (step S321). Example of the region common to the plurality of frames includes a region composed of pixels having the same pixel value (or luminance value) in the plurality of frames, a region composed of pixels having a difference in pixel value (or luminance value) in the plurality of frames equal to or less than a threshold value, and a region including such pixels.

Figure 13A:
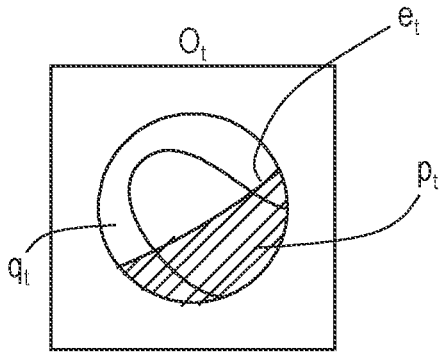
FIG. 13A is a diagram for exemplifying a video of an object on which a shadow appears.
Figure 13B:
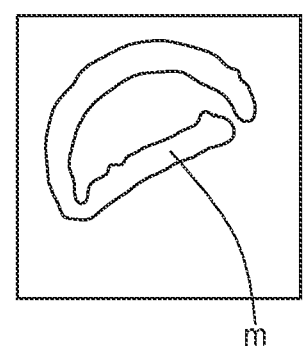
FIG. 13B is a diagram for exemplifying a mask corresponding to the video exemplified in FIG. 13A.
Figure 13C:
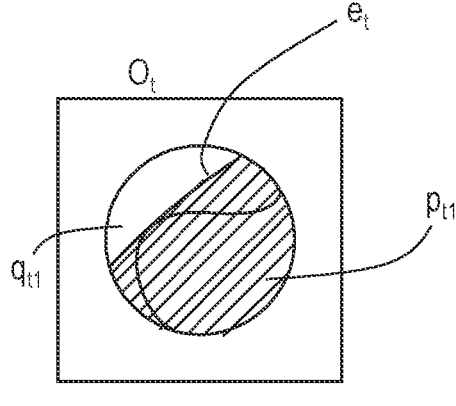
FIG. 13C is a diagram for exemplifying the video of the sphere on which the shadow appears.
Figure 13D:
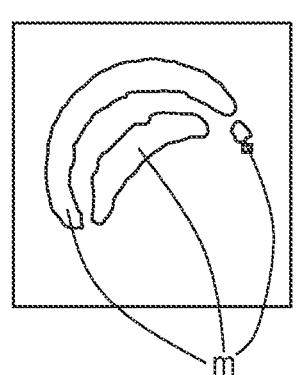
FIG. 13D is a diagram for exemplifying the mask corresponding to the video exemplified in FIG. 13C.
Figure 13E:
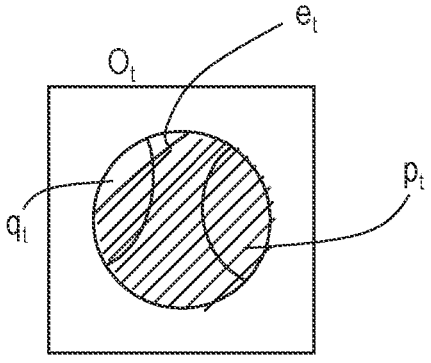
FIG. 13E is a diagram for exemplifying the video of the sphere on which the shadow appears, and FIG. 13 F is a diagram for exemplifying the mask corresponding to the video illustrated in FIG. 13E.
Figure 13F:
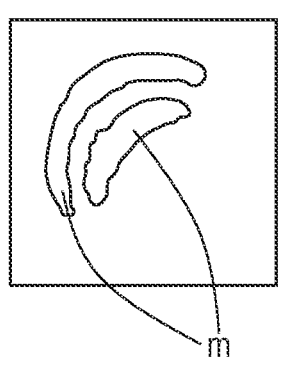

Next, the shadow region exclusion unit 32 generates a mask m for excluding information on a region including at least a part of the region common to the extracted plurality of frames (referred to "a removal region" below) (step S322). The shadow region exclusion unit 32, for example, generates an image in which the pixel value of the removal region is pix 3 (for example, pix 3=0) and pixel value of a region other than the removal region is pix 4 (for example, pix 4=1) as the mask m. Alternatively, the pix 3 and pix 4 may be set so that the change of the pixel value corresponding to the change of the coordinates becomes continuous (smooth) in the vicinity of the boundary between the removal region and the region other than the removal region. The mask m corresponding to the object image $O_t$ described in FIGS. 13B, 13D, and 13F and FIGS. 13A, 13C, and 13E is exemplified, respectively. The mask m exemplified in FIGS. 13B, 13D, and 13F is an image representing a region of a boundary part $e_t$ between the part $q_t$ directly irradiated with light and the part $p_t$ becoming the shadow and a contour region of the object.

Next, the shadow region exclusion unit 32 applies the mask m obtained in the step S322 to the object image input in the step S321, and obtains and outputs an object image obtained by excluding the removal region from the input object image (step S323). For example, the shadow region exclusion unit 32 obtains and outputs an object image in which a value obtained by multiplying a pixel value of each coordinate (x, y) of the mask m by a pixel value of each coordinate (x, y) of the object image input in the step S321 (for example, the image obtained by extracting features of the object) as the pixel value of each coordinate (x, y).

An object image obtained by excluding the exclusion region generated by the shadow region exclusion unit 32 is output to the spin state estimation unit 13 (or the spin state estimation unit 23).

<Spin State Estimation Unit 13 or 23 (Step S13 or S23)>

This processing is the same as that of the first embodiment, the second embodiment, or the modification example thereof, except that the object image output from the shadow region exclusion unit 32 is used.

Features of Present Embodiment

Also in this embodiment, the spin state of the object can be estimated regardless of the frame rate of the input video, as in the first embodiment. Further, in the present embodiment, a spin state of the object is estimated by using an object image obtained by excluding at least a part of the region common to the plurality of frames from the image corresponding to the object obtained from the input video of the plurality of frames in time-series. Therefore, the influence of the shadow appearing on the object and the boundary region can be reduced, and the estimation accuracy of the spin state of the object can be improved.

Figure 14A:
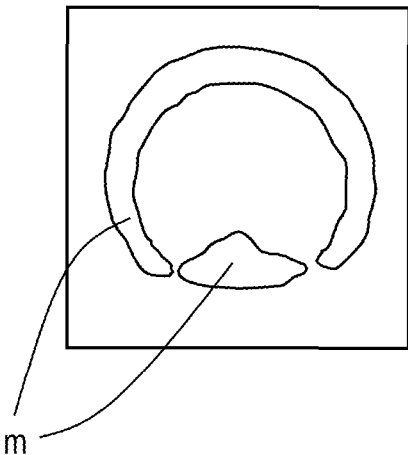
FIG. 14A is a diagram for exemplifying a mask corresponding to a video in which the shadow almost disappears.

Note that, even when no shadow appears on the object, the accuracy of estimating the spin state of the object is hardly reduced. FIG. 14A exemplifies a mask (m) when no shadow appears on the object. As exemplified in FIG. 14A, when no shadow appears on the object in FIG. 14A, the mask m excludes the contour region of the object. Even if such a mask m is applied, the texture inherent to the object necessary for estimating the spin of the object (for example, the seam of the ball) is hardly affected, and the estimation accuracy of the spin state is hardly reduced.

Figure 14B:
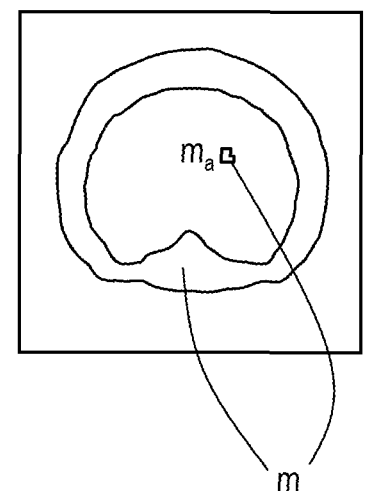
FIG. 14B is a diagram for exemplifying a region of a shaft center part of a spin shaft appearing in common in a plurality of frames in the video of the object.

Also, even if the object spins, the image of the shaft center part of the spin shaft of the object does not largely change. For this reason, the shaft center part may be included in the removal region. However, even in such a case, since the region of the shaft center part is small, the estimation accuracy of the spin state of the object is hardly reduced. FIG. 14B exemplifies the mask m when the shadow does not appear on the object but the shaft center part is included in the removal region. The mask m exemplified in FIG. 14B excludes the contour region and the shaft center part m a of the object. However, even if such a mask m is applied, the texture inherent to the object necessary for estimating the spin of the object is hardly affected, and the estimation accuracy of the spin state is hardly reduced.

[Hardware Configuration]

The spin state estimation devices 1, 2, and 3 according to each embodiment are devices configured by executing a predetermined program by a general-purpose or dedicated computer including a processor (a hardware processor) such as a CPU (central processing unit), memory such as a RAM (random-access memory), a ROM (read-only memory), and the like. The computer may include one processor and memory, or may include a plurality of processors and memories. This program may be installed in the computer or may be recorded in the ROM or the like in advance. In addition, a part or all of the processing unit may be constituted by using an electronic circuit which realizes a processing function independently, instead of an electronic circuit (circuitry) which realizes a functional configuration by reading a program like a CPU. Further, an electronic circuit constituting one device may include a plurality of CPUs.

Figure 15:
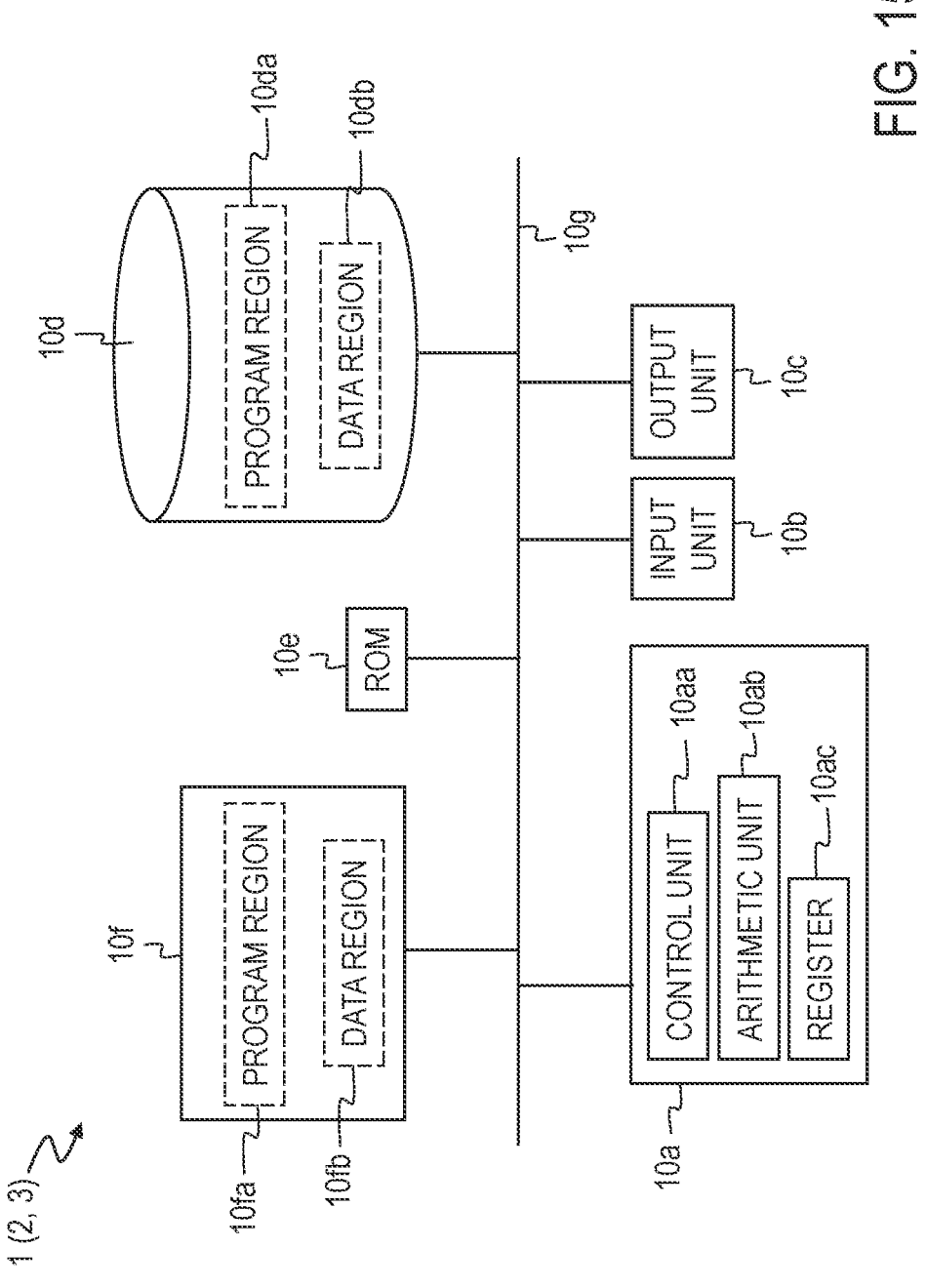
FIG. 15 is a block diagram for exemplifying a hardware configuration of the spin state estimation device of the embodiment.

FIG. 15 is a block diagram exemplifying a hardware configuration of the spin state estimation devices 1, 2, and 3 according to each embodiment. As exemplified in FIG. 15, the spin state estimation devices 1, 2, and 3 of this example include a CPU (Central Processing Unit) 10a, an input unit 10b, an output unit 10c, a RAM (Random Access Memory) 10d, a ROM (Read Only Memory) 10e, an auxiliary storage device 10f, and a bus 10g. The CPU 10a of this example has a control unit 10aa, an arithmetic unit 10ab and a register 10ac and executes various arithmetic processing in accordance with various programs read in the register 10ac. The input unit 10b is an input terminal to which data is input, a keyboard, a mouse, a touch panel or the like. The output unit 10c is an output terminal that outputs data, a display, a LAN card controlled by the CPU 10a which read a predetermined program, and the like. The RAM 10d is an SRAM (Static Random Access Memory), a DRAM (Dynamic Random Access Memory) or the like, and has a program region 10da for storing a predetermined program and a data region 10db for storing various data. The auxiliary storage device 10f is, for example, a hard disk, a MO (Magneto-Optical disc), a semiconductor memory or the like and has a program region 10fa for storing a predetermined program and a data region 10fb for storing various data. The bus 10g connects the CPU 10a, the input unit 10b, the output unit 10c, the RAM 10d, the ROM 10e and the auxiliary storage device 10f so as to exchange information. The CPU 10a writes a program stored in the program region 10fa of the auxiliary storage device 10f in the program region 10da of the RAM 10d according to the read OS (Operating System) program. Similarly, the CPU 10a writes various types of data stored in the data region 10fb of the auxiliary storage device 10f into the data region 10db of the RAM 10d. Also, the address on the RAM 10d in which this program or data is written is stored in the register 10ac of the CPU 10a. The control unit 10aa of the CPU 10a sequentially reads these addresses stored in the register 10ac, reads the program or data from the region on the RAM 10d indicated by the read address, causes the arithmetic unit 10ab to sequentially execute the operations indicated by the program, and stores the arithmetic result in the register 10ac. With such a configuration, the functional configuration of the spin state estimation devices 1, 2, and 3 is realized.

The above mentioned program can be recorded on a computer-readable recording medium. An example of computer-readable recording medium is a non-transitory recording medium. Examples of such recording media are a magnetic recording device, an optical disk, a magneto-optical recording medium, a semiconductor memory, and the like.

The distribution of the program is performed by, for example, selling, transferring, lending, or the like a portable recording medium such as a DVD or CD-ROM recording the program. Further, the program may be stored in the storage device of the server computer and transferred from the server computer to another computer via the network to distribute the program. As described above, the computer executing such a program, for example, temporally stores the program stored in the portable recording medium or the program transferred from the server computer in the its own storage device. When executing the processing, the computer reads the program stored in its own storage device, and executes the processing in accordance with the read program. As another execution form of the program, the computer may directly read the program from the portable recording medium and execute processing in accordance with the program, each time the program is transferred from the server computer to the computer, processing in accordance with the received program may be executed sequentially. In addition, by a so-called ASP (Application Service Provider) type service which does not transfer the program from the server computer to the computer and realizes a processing function only by the execution instruction and the result acquisition, the above-mentioned processing may be executed. It is assumed that the program in this embodiment includes information that is used for processing by a computer and is equivalent to the program (e.g., data that is not a direct command to a computer but has the nature of defining the processing of a computer).

Although the device is configured by executing a predetermined program on a computer in each embodiment, at least a part of these processing contents may be realized using hardware.

Other Modification Example

The present invention is not limited to the above-described embodiment. For example, the various processing described above may not only be executed in chronological order in accordance with the description, but may also be executed in parallel or individually according to the processing capacity of the device that executes the processing or as required. In addition, it goes without saying that changes can be made as appropriate without departing from the spirit of the present invention.

REFERENCE SIGNS LIST

1, 2, 3 Spin state estimation device
11 Object image generation unit
32 Shadow region exclusion unit
13, 23 Spin state estimation unit

The invention claimed is:

1. A spin state estimation device comprising a processor executing a computer-executable instructions that cause the spin state estimation device to perform operations comprising:

iteratively updating, based on varying w, an estimated spin state of a spinning object as output by comparing a target estimation image at a time point t+w·u and an object image at the time point t+w·u to dynamically select a combination of a hypothesis of spin state of a plurality of hypotheses of spin state and the w of a plurality of w, wherein an absolute value of the w is an integer of 1 or more, the u represents a unit time, the target estimation image at the time point t+w·u represents an image of the spinning object at the time point t+w·u estimated based on a captured image of the spinning object at a time point t from an input video in time-series according to the hypothesis of spin state of the plurality of hypotheses of spin state, the object image at the time point t+w·u represents another captured image of the spinning object obtained from the input video, and the dynamically selecting the combination of the hypothesis of spin state at the time point t+w·u and the w of the plurality of w is based on maximizing a likelihood of matching the target estimation image at the time point t+w·u and the object image at the time point t+w·u among target estimation images according to respective hypotheses of the plurality of hypotheses and respective w of the plurality of w, and the iteratively updating operation thereby enables estimating the spin state of the spinning object with accuracy over time.

2. The spin state estimation device according to claim 1, wherein

K as an integer of 2 or more, and the target estimation images are images of an object of time points $t_1+w\cdot u$, $t_2+w\cdot u$, . . . , $t_K+w\cdot u$ obtained by spinning the object in the object images at time points $t_1, t_2, \ldots, t_K$ by w unit time on the basis of a hypothesis of spin state and object images at the time points $t_1+w\cdot u$, $t_2+w\cdot u$, . . . , $t_K+w\cdot u$ obtained from the input video, to estimate the spin state of the object by dynamically and respectively selecting a hypothesis of spin state and w in which likelihood of the target estimation image becomes high from among a plurality of hypotheses of spin states and a plurality of w.

3. The spin state estimation device, according to claim 1, wherein the hypothesis of spin state represents information corresponding to a spin shaft of the spinning object and information corresponding to a spin amount of the spinning object, and the computer-executable instructions cause the spin state estimation device to further perform operations comprising: obtaining information corresponding to at least one of the spin shaft of the spinning object and the spin amount per unit time of the spinning object as the spin state of the spinning object on basis of information $r_w$ corresponding to the spin shaft of the spinning object, information $\theta_w$ corresponding to the spin amount of the spinning object, and w represented by the dynamically selected hypothesis of spin state.

4. The spin state estimation device, according to claim 1, wherein the hypothesis of spin state represents information corresponding to the spin shaft of the spinning object and information corresponding to a spin amount of the spinning object, and the computer-executable instructions cause the spin state estimation device to further perform operations comprising: obtaining information including information corresponding to the spin amount per unit time and not including information corresponding to the spin shaft of the spinning object as the spin state of the spinning object and/or outputs an effect of being unable to estimate information corresponding to the spin shaft of the spinning object, when the spin amount per unit time obtained based on the information $\theta_w$ and w corresponding to the spin amount of the spinning object represented by the dynamically selected hypothesis of spin state is a $\pi+2$ n$\pi$.

5. A spin state estimation method, comprising:

iteratively updating, based on varying w, an estimated spin state of a spinning object as output by comparing a target estimation image at a time point t+w·u and an object image at the time point t+w·u to dynamically select a combination of a hypothesis of spin state of a plurality of hypotheses of spin state and the w of a plurality of w, wherein an absolute value of the w is an integer of 1 or more, the u represents a unit time, the target estimation image at the time point t+w·u represents an image of a target at the time point t+w·u estimated based on a captured image of the spinning object at a time point t from an input video in time-series according to the hypothesis of spin state of the plurality of hypotheses of spin state, the object image at the time point t+w·u represents another captured image of the spinning object from the input video, and the dynamically selecting the combination of the hypothesis of spin state at the time point t+w·u and the w of the plurality of w is based on maximizing a likelihood of matching the target estimation image at the time point t+w·u and the object image at the time point t+w·u among target estimation images according to respective hypotheses of the plurality of hypotheses and respective w of the plurality of w, and the iteratively updating operation thereby enables estimating the spin state of the spinning object with accuracy over time.

6. A non-transitory computer-readable recording medium storing a program for causing a computer to function as a spin state estimation device according to claim 1.

\* \* \* \* \*